No. 719,968. PATENTED FEB. 3, 1903.
A. G. WOOD.
APPARATUS FOR TESTING PRESSURE GAGES.
APPLICATION FILED AUG. 29, 1902.
NO MODEL. 2 SHEETS—SHEET 1.
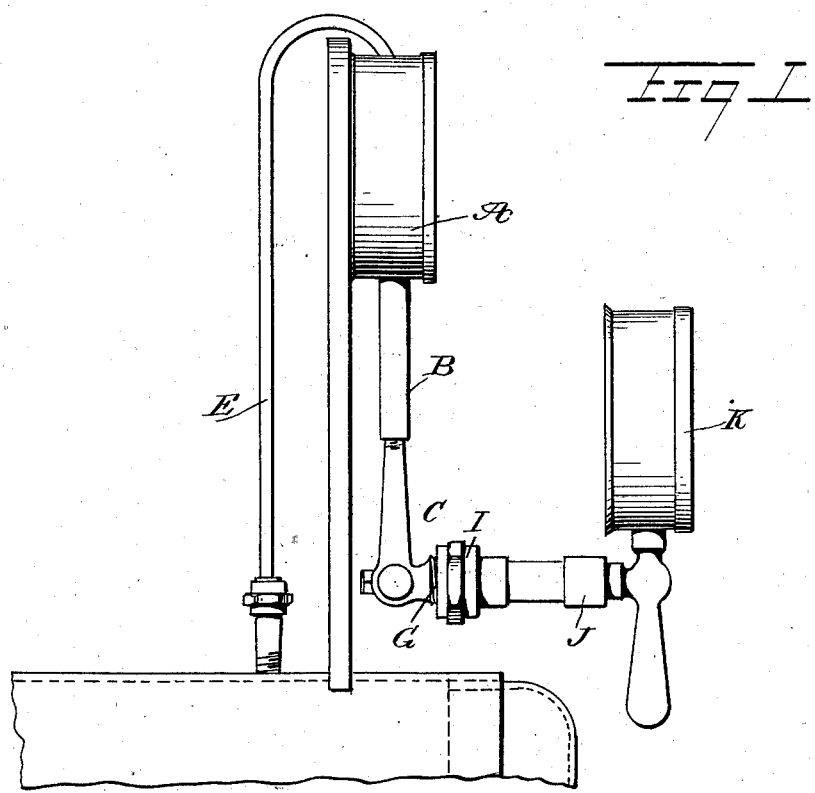
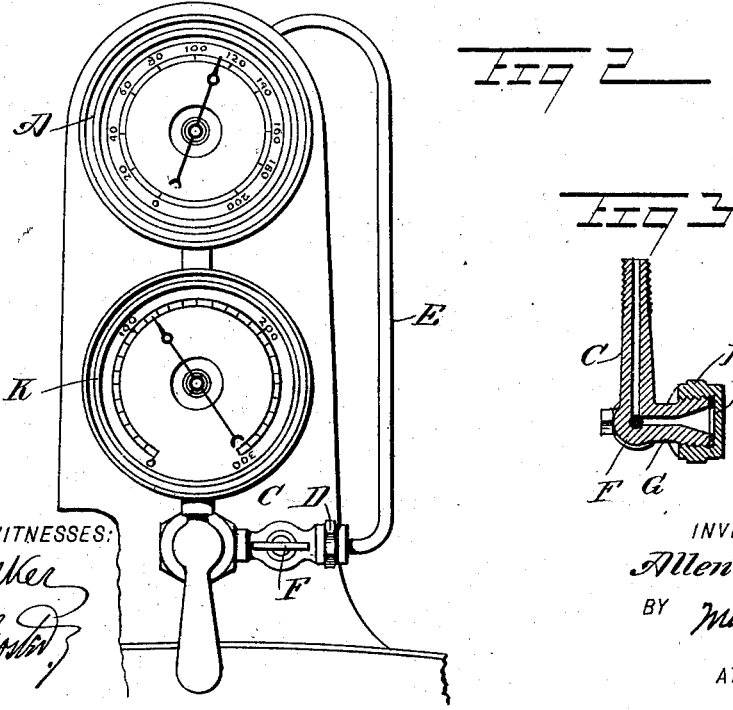
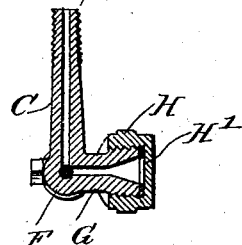
INVENTOR
Allen G. Wood
BY
ATTORNEYS.

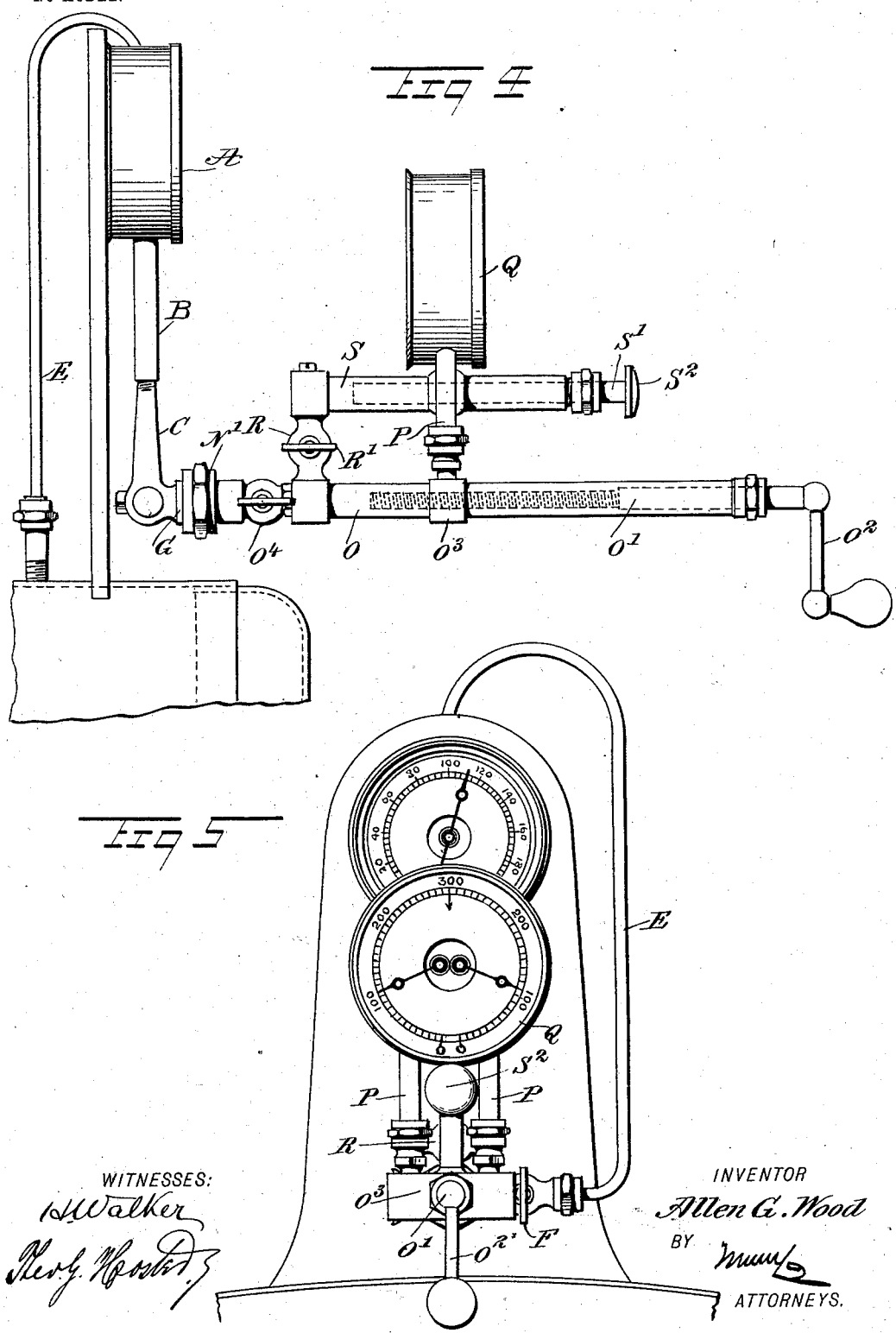

UNITED STATES PATENT OFFICE.

ALLEN G. WOOD, OF NEW YORK, N. Y.

APPARATUS FOR TESTING PRESSURE-GAGES.

SPECIFICATION forming part of Letters Patent No. 719,968, dated February 3, 1903.

Application filed August 29, 1902. Serial No. 121,486. (No model.)

*To all whom it may concern:*

Be it known that I, ALLEN G. WOOD, a citizen of the United States, and a resident of the city of New York, borough of Manhattan, in the county and State of New York, have invented a new and Improved Service-Test Apparatus, of which the following is a full, clear, and exact description.

The invention relates to apparatus for testing the accuracy of pressure-gages on locomotives, steamboats, power plants, &c.; and the object of the invention is to provide a new and improved service-test apparatus which is simple and durable in construction and arranged to enable the inspector or other person to make a quick connection with the gage to be tested without disturbing the latter's position or connections to accurately test said gage, and in case of such gage being located on a locomotive, for instance, to allow of testing it at any point along the route, whether the locomotive is dead or under steam.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement as applied to a locomotive steam-gage and arranged for testing by live steam. Fig. 2 is a front view of the same. Fig. 3 is a sectional side elevation of the pipe-fixture connecting the gage to be tested with the pressure-supply pipe. Fig. 4 is a side elevation of the improvement applied to a locomotive steam-gage and arranged for testing the same without the aid of steam-pressure from the locomotive-boiler, and Fig. 5 is a front elevation of the same.

The gage A to be tested and located in the cab of the locomotive, steamboat, power plant, &c., has its entrance-pipe B connected with one end of a pipe-fixture C, the other end of which is connected by a coupling D with a pressure-supply pipe E, leading from the steam-compartment of the boiler, to allow the steam to actuate the gage A in the usual manner to indicate the pressure in the boiler.

On the pipe-fixture C, adjacent to the coupling D, is arranged a valve F, and between this valve and the end of the pipe-fixture C, connected with the entrance-pipe B, is arranged a coupling member G, the bore of which leads to the pipe-fixture channel, as plainly indicated in Fig. 3, and this coupling member G is normally closed by a screw-cap H and gasket H'.

When it is desired to test the gage A, then the valve F is temporarily closed and the screw-cap H and its washer H' are unscrewed from the coupling member G and the latter is connected with a coupling member I, held on the entrance-pipe J of a test-gage K of any approved construction. Now when the connection is made, as described, between the test-gage K and the pipe-fixture C then the operator opens the valve F, so that the steam from the boiler acts on both gages A and K, and if there is no variation in the two gages then the gage A is accurate, and in case there is a variation it indicates that the gage A is inaccurate and has to be adjusted or repaired. After the test has been made the operator closes the valve F and then disconnects the coupling member I from the coupling member G and replaces the screw-cap H and its washer H', after which the valve F is again opened, so as to establish communication between the boiler and the gage A.

From the foregoing it will be seen that by providing the pipe-fixture C with the coupling member G a ready connection can be made between the test-gage K and the said fixture to allow of testing the gage A by the test-gage K without disturbing the gage A or its connections with the boiler. By the arrangement described the supply-pipe E is not drained, and consequently a wet connection remains at all times with the gage. It is understood that for the proper working of a steam-gage a wet connection is very desirable.

When it is desired to test the gage A without having recourse to the boiler-pressure, I provide the following arrangement, (shown in detail in Figs. 4 and 5,) it being understood that the gage A, entrance-pipe B, pipe-fixture C, coupling D, and pressure-supply pipe E remain exactly the same; but the coupling member G is connected with a coupling member N' on the end of a barrel O, containing a screw-plunger O', provided at its outer end with a handle O², under the control of the operator, for turning the screw-plunger to move the same inward or outward, as hereinafter more fully described: The barrel O is provided with a cross-piece O³, connected by an entrance-pipe P with a test-gage Q, which may be of ordinary construction, the same as the test-gage K, or it may be of a duplex character, as indicated in Fig. 5. The inner end of the barrel O is connected by a short pipe R, having a valve R', with the inner end of an auxiliary barrel S, provided with a plunger S', carrying on its outer end a knob S², adapted to be taken hold of by the operator to push the plunger S' inward or to draw the same outward, for the purpose hereinafter more fully described. The barrels S and O are filled with oil or other suitable fluid at the time their plungers S' and O' are in an outermost position, and the fluid is kept in the barrels when the device is not in use on closing the valve O⁴. In case of loss of fluid from the barrel O by leakage or other causes the fluid from the barrel S makes up for such loss, so that the barrel O, its cross-piece O³, and the entrance-pipe P to the test-gage R always remain filled.

The operation is as follows: The valve F is first closed, and then the screw-cap H and its washer H' are removed from the coupling member G, and the latter is connected with the coupling member N to attach the barrel O and the parts connected therewith to the fixture C. The plungers O' and S' are in an outermost position, and the valves O⁴ and R' are opened, and the plunger S' is then pushed inward, so as to move the fluid from the said barrel S to completely fill the pipe-fixture C and entrance-pipe B and establish an initial pressure, after which the valve R' is closed, and the operator now turns the handle O² to move the pressure-plunger O' inward to cause the fluid to act on both gages Q and A. Now if the pointers of the gages Q and A move in unison then the gage A is considered to be accurate; but if there is a discrepancy between the test-gage Q and the gage A then the latter is inaccurate and needs attention. After the test is made the valve R' is opened, and the fluid under pressure returns by way of the pipe R into the auxiliary barrel S and pushes the plunger S' therein outward, and pressure now ceases. The valve O⁴ is now closed to retain the fluid in the apparatus when not in use. The operator now disconnects the coupling member N from the member G and replaces the cap H and its washer H' and then opens the valve F, so that the gage A is again connected with the boiler-pressure. Thus by the arrangement described the gage of a locomotive, for instance, can be tested at any time along the route on which the locomotive travels irrespective of the condition of the locomotive at the time—that is, whether the locomotive is dead or under steam. It is further understood that it takes but a few minutes for an inspector to apply the apparatus to make the test and to again remove the apparatus and leave the gage in the locomotive and its connections in their original condition, it being expressly understood that the gage and its connections with the boiler are not in the least disturbed.

Having thus described my invention, I claim as new and desire to secure by Letters Patent—

1. The combination with a gage in service, of a portable service-test apparatus, and means for temporarily connecting the service-test apparatus with the said gage, to test the latter while in service, as set forth.

2. The combination with a gage in service and having a pressure-supply pipe provided with a permanent pipe-fixture, of a portable test apparatus, and connecting means for temporarily connecting the said portable test apparatus with the said pipe-fixture, to test the gage while in service, as set forth.

3. The combination with a gage in service and having a pressure-supply pipe provided with a permanent pipe-fixture, of a portable test apparatus, connecting means for temporarily connecting the said portable test apparatus with the said pipe-fixture, to test the gage while in service, and a valve in the pipe-fixture, between the said connecting means and the source of supply for the pressure-supply pipe, as set forth.

4. The combination with a locomotive-gage, its supply-pipe and pressure-supply for the same, of a portable service-test apparatus arranged for temporary connection with the said supply-pipe, to test the said locomotive-gage while in service, as set forth.

5. The combination with a locomotive-gage, its supply-pipe and pressure-supply for the same, of a portable service-test apparatus arranged for temporary connection with the said supply-pipe, to test the said locomotive-gage while in service, the said testing apparatus having an initial-pressure-supply device for producing an initial pressure on the locomotive-gage and on the gage of the service-test apparatus, as set forth.

6. A pressure-gage in a locomotive or the like, a pressure-supply pipe permanently connecting the locomotive-pressure supply with the said pressure-gage and provided in its length with a pipe-fixture having a coupling member, and a valve in the pipe-fixture between the coupling member and the pressure-supply, in combination with a portable testing apparatus comprising a main pump provided with a barrel having a coupling member for engagement with the pipe-fixture-coupling member, a plunger operating in the barrel, a test-gage connected with the barrel, an auxiliary hand-pump having its barrel connected with the barrel of the said main pump, and a plunger in the barrel of the auxiliary pump, as set forth.

7. The combination of a service-gage and its connection with the source of supply of a portable service-test apparatus, comprising a main pump arranged for direct attachment to the said test-gage connection while the service-gage is in use on the locomotive, a test-gage connected with the said pump, and an auxiliary hand-pump having its barrel connected with the barrel of the main pump to allow of supplying the service-gage with a fluid and thereby establish a fluid connection between the gages, as set forth.

8. A service-test apparatus comprising a pipe-fixture for connection at one end with the gage to be tested and at the other end with the pressure-supply pipe for the said gage, a valve in the said pipe-fixture, adjacent the end connected with the pressure-supply pipe, a coupling member on the pipe-fixture, between the valve and the end leading to the gage to be tested, a main barrel having a coupling member for connection with the coupling member on the pipe-fixture, a screw-plunger movable in the said main barrel, a valve on the barrel, adjacent to the coupling member, a test-gage connected with the barrel, an auxiliary barrel having a valved connection with the main barrel, and a hand-actuated plunger in the said auxiliary barrel, as set forth.

In testimony whereof I have signed my name to this specification in the presence of two subscribing witnesses.

ALLEN G. WOOD.

Witnesses:
 THEO. G. HOSTER,
 EVERARD BOLTON MARSHALL.